No. 641,594. Patented Jan. 16, 1900.
A. HARTWICH.
GARBAGE CART.
(Application filed Jan. 7, 1899.)
(No Model.)
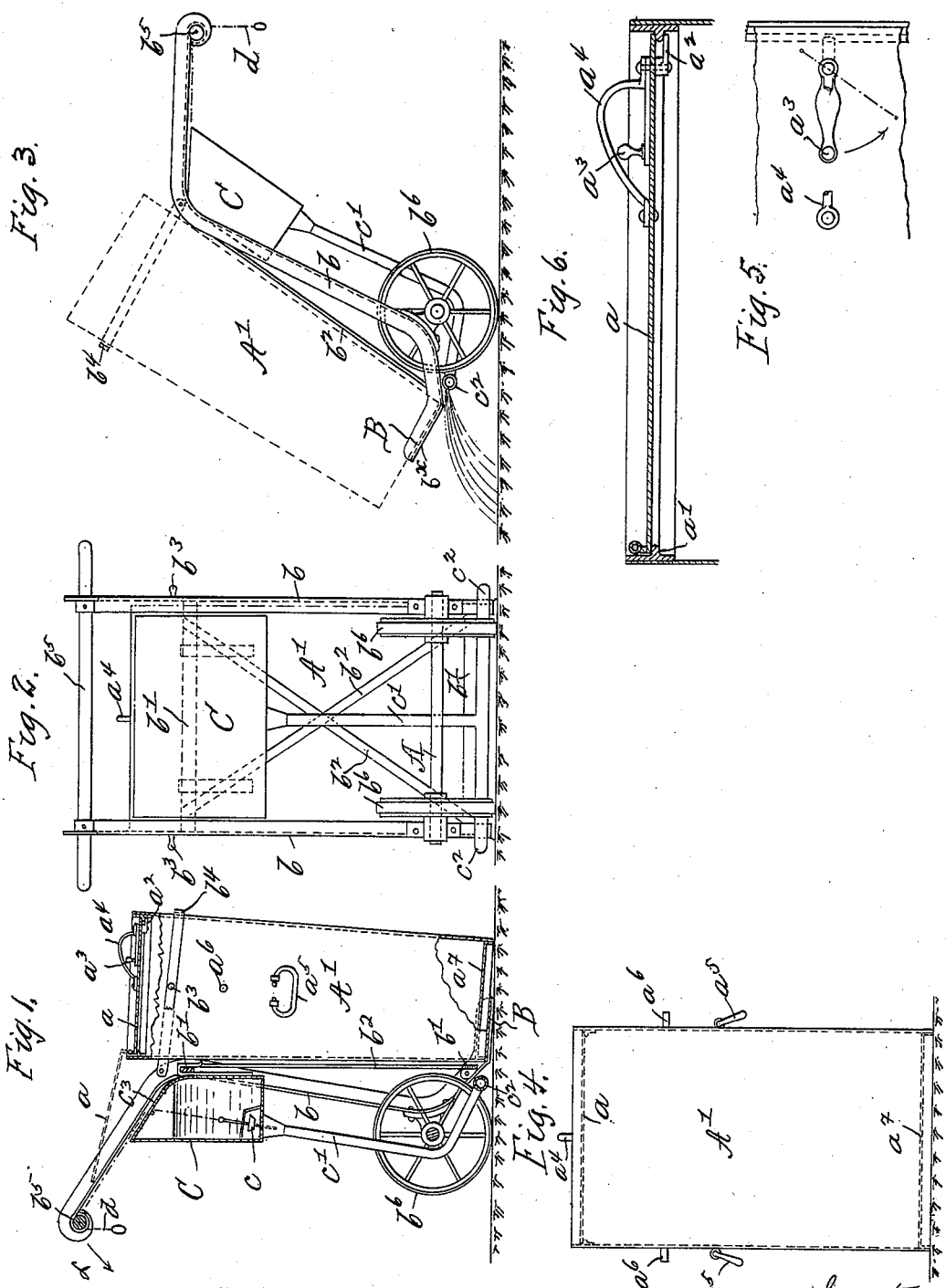
Witnesses
Inventor,
Alexander Hartwich.
by
Atty.

UNITED STATES PATENT OFFICE.

ALEXANDER HARTWICH, OF VIENNA, AUSTRIA-HUNGARY.

GARBAGE-CART.

SPECIFICATION forming part of Letters Patent No. 641,594, dated January 16, 1900.

Application filed January 7, 1899. Serial No. 701,443. (No model.)

*To all whom it may concern:*

Be it known that I, ALEXANDER HARTWICH, a subject of the Emperor of Austria-Hungary, residing at Vienna, in the Province of Lower Austria, in the Empire of Austria-Hungary, have invented certain new and useful Improvements in Arrangements for Collecting and Transporting Sweepings and Refuse; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to garbage carts or trucks, and more especially to hand carts or trucks; and it has for its object the combination with such a cart or truck of sprinkling appliances and a removable garbage-receptacle, as will now be fully described, reference being had to the accompanying drawings, in which—

Figure 1 is a side elevation of the garbage-truck and its receptacle tilted to receive garbage. Fig. 2 is a left-hand elevation of Fig. 1, and Fig. 3 is a side elevation showing the truck and receptacle in use when sprinkling before sweeping and collecting. Fig. 4 is a front elevation of the garbage-receptacle detached from the truck. Fig. 5 is a fragmentary top plan view of the cover of said receptacle, the handle being broken away; and Fig. 6 is a cross-section of the upper portion of the receptacle and of its cover.

Referring more particularly to Figs. 1, 2, and 3, wherein I have shown a two-wheeled truck for a garbage-receptacle, the truck consists of side bars $b$, of angle-iron, united at their rear ends by a handle-bar $b^5$ and at the forward end by a cross-bar $b'$, a like cross-bar $b'$ connecting said side bars at a point near the handle-bar $b^5$, and to said cross-bars $b'$ are secured crossed braces $b^2$, thus forming a strong rigid truck-frame. The side bars $b$ are provided at their forward ends with bearings for the truck-wheel axle A, the wheels $b^6$ being mounted thereon between the side bars $b$ and close thereto. The forward ends B of the side bars $b$ are bent upwardly at the proper angle, so that when the truck is tilted for the loading of the receptacle, Fig. 1, said bar ends will have a firm bearing on the street surface.

The receptacle A' is supported by the cross-bars $b'$ and reaches $b^2$, and inasmuch as the side bars $b$ of the truck are made of angle-irons they form on opposite sides of the truck-frame, at its forward and near its rear end, bearings for the garbage-receptacle A' to hold it against lateral displacement, said vessel being held by the bar ends B against forward displacement on the truck. Near its upper end the said receptacle A' is secured to the truck by means of a yoke $b^4$, fitting the receptacle, said yoke being pivoted to the side bars $b$ of the truck and provided with handles $b^3$.

As shown in Figs. 1 and 3, the rear ends of the side bars $b$ are bent downwardly at such an angle that the truck may be properly trundled along when sprinkling before sweeping or for transporting the garbage to a place of deposit.

To the under side of the truck, at its rear end, is secured a water-receptacle C, which is hooked onto the rear cross-brace $b'$, both said brace and the like forward brace being flat metal bars, as well as the crossed braces or reaches $b^2$. The receptacle C has a supply-aperture in its rear wall closed water-tight by a cover $c^3$, and from the forward end wall of said receptacle extends a T-shaped pipe $c'$, the transverse branch $c^2$ of which lies immediately below the upwardly-bent portion $b^\times$ of the side bars $b$, intermediate of the straight portion of said bars and the confining and supporting ends B thereof, so that when the truck is tilted into the position Fig. 1 the cross branch $c^2$ of the pipe will be clear of the ground, said cross branch $c^2$ being of course provided with suitable perforations to direct the water in fine jets in a forward direction—*i. e.*, in the direction of motion of the truck. As more clearly shown in Fig. 2, the pipe $c'$ extends from receptacle or reservoir C centrally along the under side of the truck and under the truck-wheel axle and is bent upwardly at its forward end, so as to hold the cross branch $c^2$ in the position above described across the forward end of the truck.

The port in the water-reservoir C opening into pipe $c'$ is controlled by a cone-valve $c$, whose stem is suitably guided in a bracket in said reservoir and has attached thereto a cord $d$, which passes out of the reservoir C around the handle-bar $b^5$ and has attached to its free end a ring or is provided with a loop, so that on pulling the said cord the valve is unseated, while when the cord is released the said valve drops back to its seat.

The garbage-receptacle A', preferably of sheet metal, is of polygonal form in cross-section. Two of its opposite sides are, however, gradually reduced in width from top to bottom, as shown, and have handles $a^5$ secured thereto.

In the upper end of the receptacle is hinged a cover $a$, provided with a handle $a^4$, so that when said receptacle is secured to the truck and the latter in an upright position, Fig. 1, the said cover can be thrown back on the lateral flanges of the side bars $b$ at the handle-bar ends, as shown in dotted lines in Fig. 1. The outer edge of the cover $a$ rests upon a suitable flange or ledge projecting from the inner face of the front wall of the receptacle, and to said cover $a$ is connected a locking-bolt adapted to engage the under side of said flange, Fig. 6, said bolt $a^2$ being provided with a handle or knob $a^3$, secured to the bolt $a^2$, so that when turned on the cover in the direction of arrow, Fig. 5, the bolt will be disengaged from the aforesaid flange, as will be readily understood.

Having thus described my invention, what I claim as new therein, and desire to secure by Letters Patent, is—

1. The combination with a garbage hand-truck of a water-reservoir and a sprinkler connected therewith, for the purposes set forth.

2. The combination with a two-wheeled garbage hand-truck of a water-reservoir, a perforated pipe extending across the forward end of said truck connected with said reservoir, a valve controlling the flow of water from the reservoir to said pipe, and means for unseating said valve, for the purpose set forth.

3. A two-wheeled garbage hand-truck having side bars made of angle-iron bent at different angles in an upward direction at their forward ends to form abutments for the lower end of a garbage-receptacle, while the horizontal web or flange of said side bars form bearings for said receptacle, substantially as set forth.

4. A two-wheeled garbage hand-truck having side bars made of angle-iron bent at different angles in an upward direction at their forward ends to form abutments for the lower end of a garbage-receptacle, while the horizontal web or flange of said side bars form bearings for said receptacle; in combination with a yoke pivoted to said side bars near the handle end of the truck for securing the upper end of the receptacle, substantially as set forth.

5. The combination with a two-wheeled garbage-truck having the forward or wheel end of its side bars bent upwardly at different angles, and a yoke pivoted to said side bars near their handle ends; of a sheet-metal garbage-receptacle supported at its bottom end by said upwardly-bent side bars and held on the truck near its opposite end by the aforesaid yoke, substantially as and for the purpose set forth.

6. The combination with a two-wheeled garbage hand-truck having side bars made of angle-iron connected by flat cross-bars secured to the horizontal webs or flanges of said bars near the wheel and handle ends thereof respectively, and crossed flat-bar reaches secured to said cross-bars, said side bars having their forward or wheel ends suitably bent in an upward direction, and a yoke pivoted to the vertical flanges of the side bars near their handle ends; of a sheet-metal garbage vessel fitting between the vertical flanges of the truck side bars and seating on their forward upturned ends and held to the truck by the aforesaid yoke, substantially as and for the purposes set forth.

In testimony that I claim the foregoing as my invention I have signed my name in presence of two subscribing witnesses.

ALEXANDER HARTWICH.

Witnesses:
   JOS. RUBRARCH,
   ALVESTO S. HOGUE.